Figure 7:
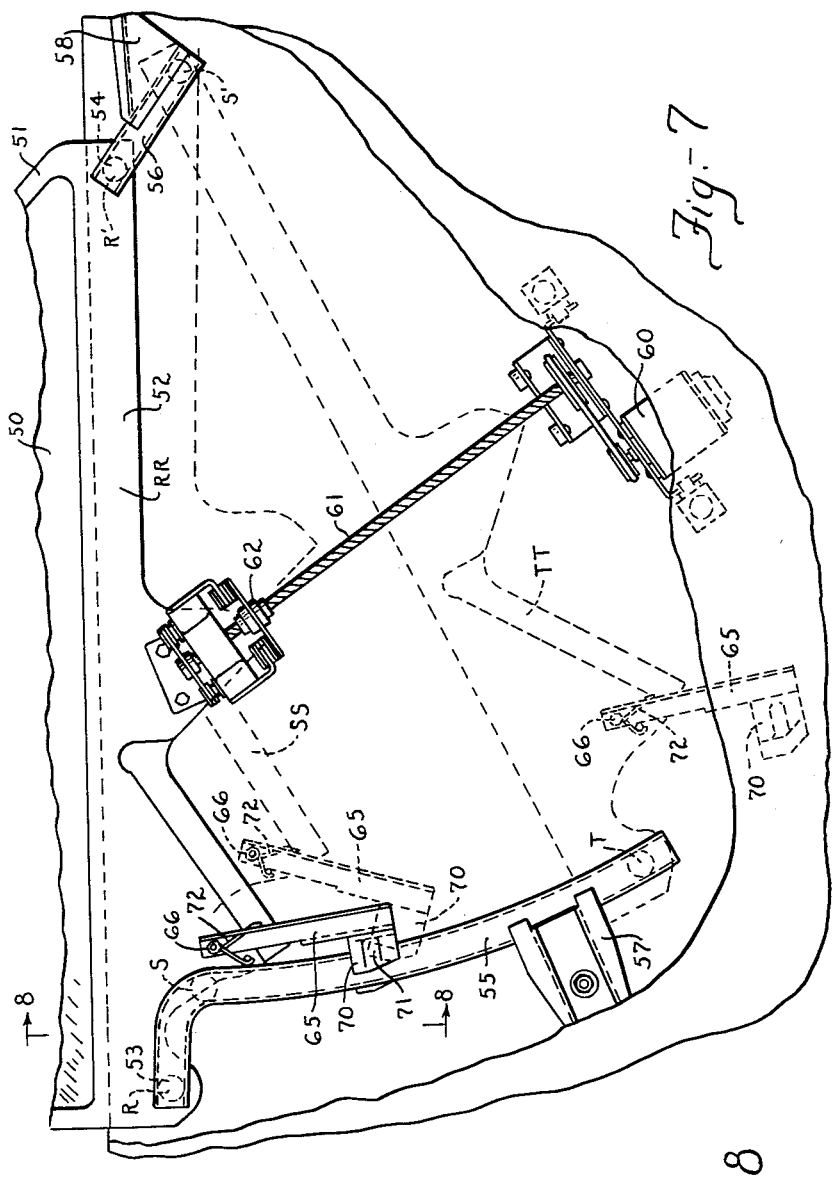

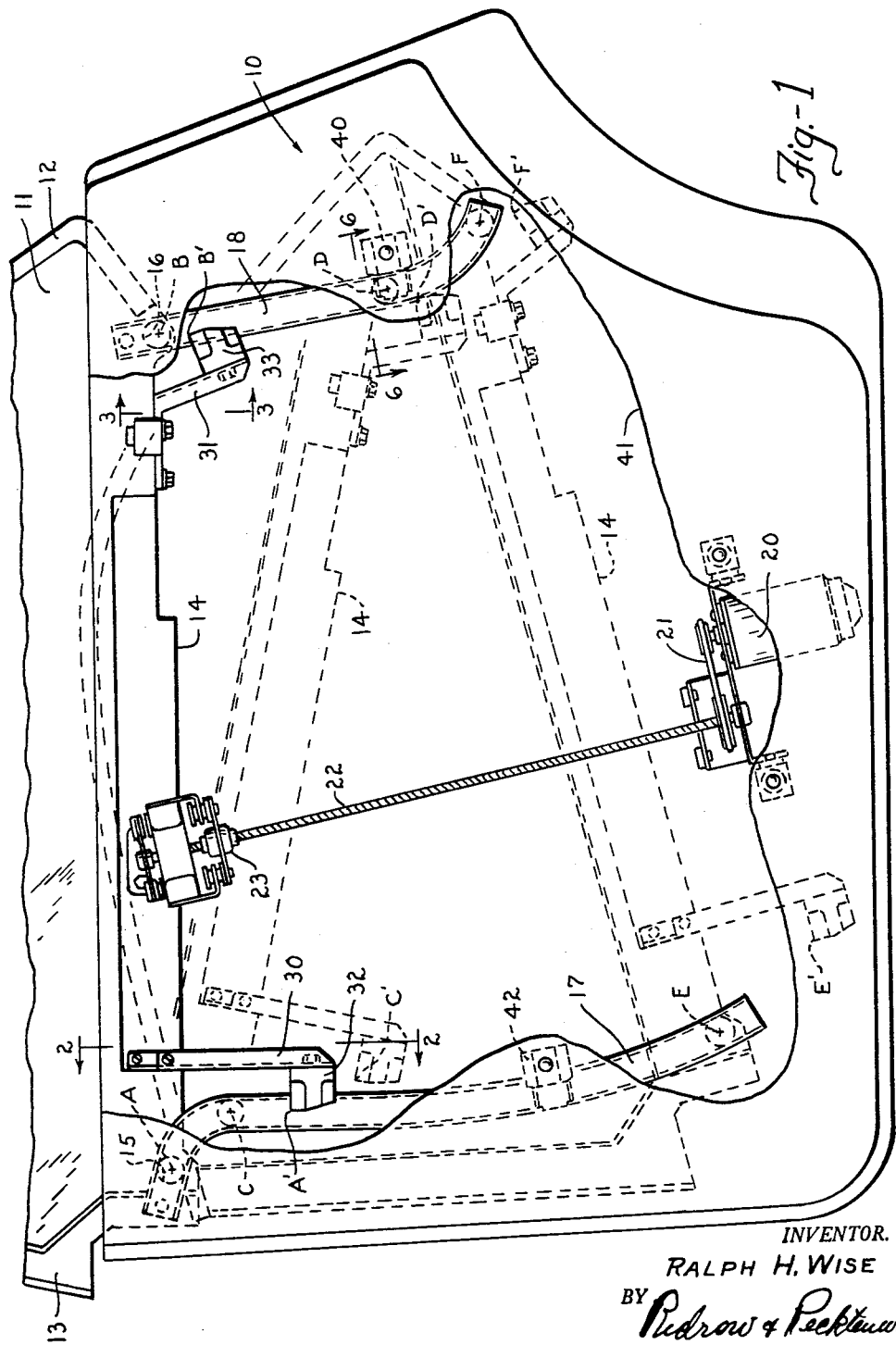

Oct. 31, 1961 R. H. WISE 3,006,681
VEHICLE WINDOW STABILIZER
Filed July 10, 1957 3 Sheets-Sheet 2
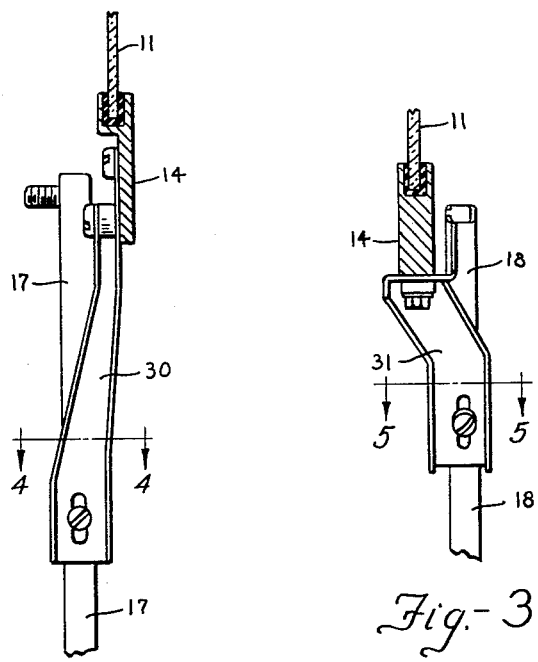
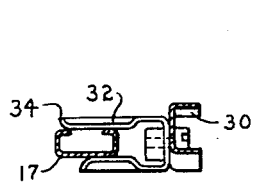
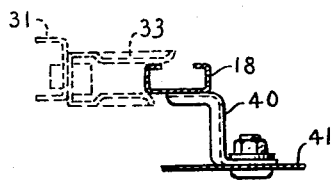
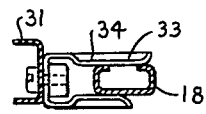
INVENTOR.
RALPH H. WISE
BY Redrow + Rechtenwald
ATTORNEYS INVENTOR.
RALPH H. WISE
BY Redrow & Recktenwald
ATTORNEYS

United States Patent Office 3,006,681
Patented Oct. 31, 1961

3,006,681
VEHICLE WINDOW STABILIZER
Ralph H. Wise, Tampa, Fla., assignor, by mesne assignments, to The Anderson Company, a corporation of Indiana
Filed July 10, 1957, Ser. No. 670,901
20 Claims. (Cl. 296—44.5)

This invention relates to automobile windows and more particularly to stabilizing means for the glass in certain door and panel structures for the hardtop and convertible types, for example, where there is no center pillar.

This application is a continuation-in-part of an application entitled "Vehicle Window Stabilizer," filed December 11, 1956, Serial No. 627,597, now abandoned.

Modern styling trends in automobile construction have led to the introduction of the so-called hardtop design which has no center pillar. This presents a problem in four-door vehicles in that glass in the doors must be made to meet to provide an effective seal to complete the enclosure, and since the rear door is usually hingedly supported at the front end, the glass in at least one of the front or rear doors must not only be adapted to be raised and lowered, but it must also be shiftable longitudinally to extend over the hinge post to meet the glass in the other door. Thus, doors are being constructed for use in four-door hardtops with glass that has a longitudinal as well as an up and down movement and usually this composite motion is built into the mechanism for controlling the raising and lowering of the window glass of the rear door. In convertibles and four-door hardtops, this motion is a compound longitudinal and rotative movement substantially in the vertical plane occupied by the glass.

A similar problem exists with respect to two-door hardtops and convertibles in that the window in the rear quarter panel must be raised and brought forward into sealing engagement with the front window.

In the above window constructions, when the glass is subject to lateral vibrations, a problem arises especially when the glass is only partially raised. It is apparent that in either of the fully raised or lowered positions, the glass is adequately supported between the top and the garnish molding or between the guide tracks and the garnish molding respectively; however, at the intermediate positions there are no side guide tracks to support the portion of the glass projecting above the garnish molding and the glass is held in this situation only by a bottom support strip and a pair of front and rear track following means. Since the track following means may be engaged in their tracks at points closely adjacent the garnish molding when the glass approaches the upper end of its run, and as a relatively large portion of the window projects above the molding in an unsupported manner, it is essential that means to stabilize the glass against undue vibration be provided.

This invention provides a structure co-operating with the support for the glass to assist in stabilizing a partially raised window against all lateral vibrations and especially the window of a door when the door is being slammed. The invention provides downwardly extending means carried on the support strip fixed to the bottom edge of the glass, which means engages with fixed elements in the body of the door or panel to form, with the glass, a cantilever type support therefor which effectively stabilizes the glass even when the door or panel receives a rather violent shock. These stabilizing means may be so proportioned as to ride up and down with the glass support means to clear all obstacles in the door or panel and yet engage suitable fixed anchoring means at the proper time to provide a relatively solid support for the glass in all of its intermediate positions where an undue portion of the glass projects above the garnish molding of the vehicle's body.

The preferred embodiments of the invention are shown and described herein and as a typical representation, it is shown as being built into an automobile door and panel. It will be understood, however, that the invention is not to be limited by reason of this manner of illustrating its utility.

Figure 8:
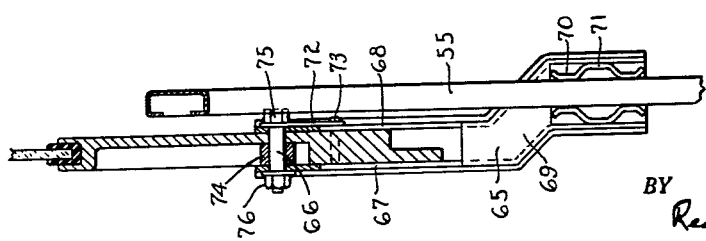

In the drawings:
FIGURE 1 is a side elevation of a conventional rear door structure with the present invention built in;
FIGURE 2 is a view taken on line 2—2 of FIGURE 1;
FIGURE 3 is a view taken on line 3—3 of FIGURE 1;
FIGURE 4 is a view taken on line 4—4 of FIGURE 2;
FIGURE 5 is a view taken on line 5—5 of FIGURE 3;
FIGURE 6 is a view taken on line 6—6 of FIGURE 1;
FIGURE 7 is a side elevation of a rear-quarter panel structure with a modified form of the present invention; and
FIGURE 8 is a view taken on the line 8—8 of FIGURE 7.

Referring to FIGURES 1–6 of the drawings, a rear door structure generally indicated 10 for a typical hardtop body is shown which is adapted to be hingedly mounted on a hinge pillar at its front end. The pillar and hinges are not shown and it will be understood that the pillar does not extend above the belt line of the body structure, the post being rigidly supported at its bottom end on the floor of the body. In this construction, the edge of the body portion of the glass 11 is shown trimmed with a protective frame 12 and at its front end, the frame has a sealing element 13 which is adapted to project in a manner to meet with and be sealed against the raised glass of a front door element when the glass in the rear door is raised to its fully projected position. In order to retract the glass 11 into the door to open the window in the structure here shown, it is apparent that the meeting rail 13 must first be moved rearwardly to clear the hinge pillar before the glass and frame 12 can be lowered into the body of the door.

At its bottom edge, the glass is fixed to the longitudinally extending support member or bar 14 provided with nylon wheels 15 and 16 at its front and rear ends respectively. The wheels 15 and 16 run in guide tracks 17 and 18 fixedly supported in the body of the door. The tracks 17 and 18 coact with wheels 15 and 16 to guide the window and control its longitudinal and rotative motion as it is raised and lowered all as is well known in the art.

Any conventional actuator may be used to raise and lower the window, and preferably a suitable power drive mechanism including an electric motor 20 which drives a pulley 21 which in turn drives the screw element 22 is provided to raise and lower the window, such power system forming the subject of my copending application, Serial No. 630,614, filed December 26, 1956, for "Window Regulator Mechanism," now Patent No. 2,872,184, issued February 3, 1959. In this mechanism the screw 22 co-operates with a nut device 23 which is supported from the bar 14 so that as the screw 22 is rotated the bar 14 is raised or lowered thereby.

As the bar 14 is lowered from the full line position shown in FIGURE 1, wherein the wheels 15 and 16 occupy the positions A and B, the wheels roll simultaneously so that the rear wheel 16 drops rapidly while the front wheel 15 is moving rearwardly in the top portion of track 17. Thus the front wheel 15 moves rearwardly from position A to position C to shift the sealing element 13 of the window rearwardly to clear the hinge pillar while the window rotates about the axis of wheel 15 and the rear wheel 16 moves from position B to position D. In the intermediate position then, the front wheel 15 will occupy the position C while the rear wheel 16 will occupy a position indicated at D. At about this point in the window lowering cycle, the rear wheel 16 slows down while front wheel 15 moves rapidly down in its track and while wheel 16 moves from position D to F, the window rotates about the axis of wheel 16 and wheel 15 moves from C to E. At the fully retracted position, the front wheel 15 will then occupy the position indicated at E while the rear wheel 16 will occupy the position F. In following the motion described above, it is evident that the window is first lowered at its rear end by the co-operation between the wheels and their guides while simultaneously the sealing element 13 is moving rearwardly. Thereafter, the window pivots about the axis of the rear wheel 16 in the plane of the glass, while the front wheel 15 moves downwardly in guide track 17. Thus, the desired longitudinal shifting and rotative movement necessary to retract the window into the door is accomplished.

As above explained, when the glass is positioned at an intermediate point, and when it is supported by wheel 15, 16 and its engagement with the garnish molding, the window must be stabilized or further supported in some manner and especially when the door is being closed. The present invention has for its purpose the provision of a suitable support for the projected glass 11 at the upper end of its travel at all times after the upper portion of the glass and frame 12 leaves its contact with the top of the vehicle. In the form here shown, this support includes a pair of downwardly extending hook members 30 and 31 preferably mounted integral with the support rail 14 disposed at the lower edge of the glass. The members 30 and 31 as may be seen in FIGURES 4 and 5, take the form of channel elements provided with suitable means and at their lower ends adapted to coact with the fixed tracks 17 and 18. The channel-shaped elements 30 and 31 are provided with integral generally U-shaped hook means 32 and 33 at their lower ends that are adapted to embracingly engage the upper ends of guide tracks 17 and 18 respectively. As best shown in FIGURES 4 and 5, the hook elements 32 and 33 may be provided with stiffening flanges 34 and at their open ends, the flanged portion of hook elements are flared to provide a funnel-like entrance way to guide the contact between the hook element and the guide track for a purpose that will appear below.

As the window is lowered from the position shown in FIGURE 1, the window carried on bar 14 initially tends to turn about the axis of wheel 15 and shift rearwardly while the rear wheel 16 drops down in guide track 18. As the bar 14 swings downwardly generally in an arc at its rear end, the hook element 31 is swung downwardly and somewhat forwardly toward the front of the door 10 so that the hook element 33 ultimately becomes disengaged from the track 18 at about the point in the cycle when the rear portion of the glass has passed into the garnish molding a sufficient distance to be substantially supported between the garnish molding, wheel 16 and guide track 18. As above explained, this first motion causes wheel 16 to move from position B to position D while the window moves rearwardly and pivots downwardly. The hook element 33 is caused to slide down and forwardly at this time and the parts are proportioned such that point indicated as B' on hook 33 moves to point D' when wheel 16 is at position D. The hook 33 is thus made to swing clear of track 18 and its support bracket 40 fixed to the inner panel 41 of the door. As the window starts its downward movement, the hook element 30 and its hook 32 maintain contact with guide track 17 to provide a cantilever support for the still partially projected front portion of the glass window while it is disposed above the garnish molding and after its top edge leaves its support in the meeting channel with the roof section. As the window continues its downward movement and after the rear portion of the glass has been substantially fully retracted into the door, the bar 14 which has been shifted somewhat rearwardly swings about the axis of rear wheel 16 which is disposed at about position D until the front hook 32 is swung out of contact with guide track 17 in order to clear the bracket 42 that supports front guide track 17. At the point where hook element 32 loses contact with track 17, the glass will have been lowered sufficiently such that its front edge is then adequately supported by the front wheel 15, guide track 17 and the garnish molding of the door structure.

In the form of the invention described above, the hook elements 30 and 31 are shown as interengaging with the relatively fixed tracks 17 and 18. With certain constructions, it is suggested that flange means might be integrated with the tracks 17 and 18 to coact with the hook means 30 and 31 or separate relatively fixed anchoring means could be mounted on the inside door panel 41 to engage with the embracing hook elements 32 and 33. It is to be understood, however, that all such other means for coacting with the hook elements 30 and 31 must be proportioned such that the hooks 32 and 33 embracingly engage the relatively fixed means whenever the window is projected so far as to need additional support against lateral vibrations. The disclosed cantilever type support here provided has been found to be entirely effective to contain all normal forces encountered in such situations.

With the stabilizing means above described, built into a door or the like it is apparent that at all times the glass in the door is properly supported either within the body of the door itself or in partially extending or intermediate positions by wheels 15, 16, and the garnish molding assisted by the hook elements 30 and 31 which engage on the relatively fixed anchoring means represented by tracks 17 and 18.

FIGURES 7 and 8 show a modified form of stabilizer structure for use with a window mounted in a rear-quarter panel of an automobile wherein the same problem exists of tracking the window rearwardly to clear the latch pillar as the first movement in lowering the window. The initial rearward movement is followed immediately by a purely pivotal movement of the window about the rear pivot. The glass 50 is surrounded by a frame 51 which has a rigid support member 52 attached along its bottom edge. The support member 52 has a pair of nylon wheels 53, 54 mounted on the front and rear corner portions, respectively, which are adapted to run in the guide tracks 55 and 56 fixedly supported by brackets 57, 58, respectively, in the rear-quarter panel of the automobile body. The guide track 55 is C-shaped in cross-section and has substantially the same contour as the guide track 17 of FIGURE 1. The guide track 56 is also C-shaped in cross-section and is substantially straight lengthwise so that the bracket 58 will hold the track at an angle downwardly and rearwardly with respect to the horizontal. The tracks 55, 56 and their mounting in the quarter panel are the conventional guides well known in the art.

Any form of known actuator may be used to raise and lower the window 50, but the preferred actuator is like that shown in the above-mentioned copending application.

The window is closed when it occupies the full line position RR shown in FIGURE 7 with the wheels 53 and 54 in the positions R—R', respectively. As the window is opened, the wheels 53 and 54 simultaneously roll in the tracks 55, 56, respectively, such that the front portion of the window moves almost straight back while the rear portion of the window moves backwardly and downwardly to the dotted line position designated SS with the wheels positioned at S—S'. During this movement, the front portion of the rear window separates from the rear meeting rail of the front window (not shown) and the rear window clears the latch pillar of the panel. In the dotted line position SS, the rear wheel 54 has reached its extreme point S' of travel and now functions as a pivot axis such that the arc of the front track 55 from position S to the bottom is the arc of a circle using the pivot axis of rear wheel 54 in position S' as the center. Continued lowering of the window is a pivoting movement about the rear wheel 54 in position S' until the window is fully retracted whereupon the front wheel 53 is in the position T and the support member 52 is in the dotted line position TT. All motions of the window from the fully raised position RR, to the intermediate position SS and to the fully lowered position TT, are all performed in the plane of the glass.

With the window completely lowered, as shown in the dotted line position TT, the need for lateral support is not an important consideration, for the edges 51 of the glass 50 are engaged by the various moldings of the panel. However, as the window is raised, for instance, to the dotted line position SS in hardtop models or to the solid line position RR in convertible models, the need for lateral support for stabilizing the window becomes apparent. The modified stabilizing mechanism herein shown, especially for use in a rear-quarter panel structure, comprises a single hook member 65 pivotally fastened to the lower portion of the support member 52 by means of the pin 66 passing through the parallel sides 67, 68 of the hook member 65. The sides 67, 68 of the hook member 65 are joined together by a wall 69 along a portion removed from the pin 66 and has a U-shaped hook means 70 attached thereto at a lower edge portion. The hook means 70 is the same as hook means 32, 33 of FIGURES 1, 4–6 and has stiffening ribs 71 at the open end portion. The hook means 70 is flared at the open end to provide an entrance way to guide the hook means 70 into proper contacting relation with respect to the sides of the track 55. Wrapped around an extending end portion of the pin 66 is a spring 72 which has one end engaging with a peg 73 on the support member 52 and has the other end portion bearing against the rear edge of the one side 68 of the hook member 65. The loading of the spring 72 is such as to urge the hook member 65 in a clockwise direction about the pin 66 as viewed in FIGURE 7.

The pin 66 passes through the sides 67, 68 of the hook member 65 and has a spacer 74 between the wall of the support member 52 and the side 67 to support the sides 67, 68 in parallel relation. The opening for the pin 66 is spaced inwardly from the edge of the support member 52 such that the sides 67, 68 of the hook member 65 overlap the wall of the support member 52 throughout a reasonable length thereof such as to add rigidity to the hook member 65 in a direction transverse to the plane of the window while permitting restrained pivoting movement of the hook member about the pin 66 in the plane of the window.

With the window in the retracted position of the dotted lines TT, the hook member 65 is disengaged from the track 55 since no lateral support for the window is required. As the window is raised, it reaches a point where the hook means 70 on the hook member 65 engages with the track 55 to provide a support for the window to hold it firm against vibration in a direction transverse to the plane of the window. The hook means 70 continues to engage with the tract 55 throughout the continued raising of the window as shown in the dotted line position 55 of the window. Further raising of the window causes the wheel 53 to move forwardly as it rides in the top portion of the forward track 55 and wheel 54 rides up the rear track 56. The base of the hook means 70 on the hook member 65 will strike the track 55 during this last-described forward movement of the window such that the hook member 65 will start to pivot rearwardly about the pin 66 and against the force of the spring 72 until the solid line position of FIGURE 7 is reached. The effective stability of the window in a direction normal to its plane will thus be maintained by the hook member 65 engaging the track at all times.

The pivoting of the hook member 65 about the pin 66 and against the spring load 72 does not effect the rigidity of the hook member 65 relative to the window in a direction transverse to the plane of the window. This is accomplished by pivoting the hook member 65 in such a way that the sides 67, 68 of the hook member have a relatively wide area in flatwise bearing relationship with the walls of the support member 52 with the head 75 of the pin in close fitting relation with respect to the side 68 and the nut 76 on the other end of the pin in close fitting relation with the side 67 such that little or no play is permitted between the sides 67, 68 of the hook member 65 and the support member 52. The loading of the spring 72 in a clockwise direction is of such a magnitude as to assure holding the hook member 65 in engagement with the track 55, yet still permitting pivoting of the hook member 65 under a predetermined loading created by the motion of the window. The spring must be of such strength as to return the hook member to its dotted line position shown with the support member 52 in position SS upon lowering the window in the usual manner.

As shown in FIGURES 7 and 8, since the rear portion of the window moves through a very limited range and remains at all times in relatively close relation with respect to the garnish molding, it is not necessary to provide stabilizing means thereto. The only stabilizing means deemed necessary in this form of the device being that above described with respect to the front portion of the window and the track 55.

Having thus described the preferred forms of my invention, it is obvious that modifications thereof may occur to those skilled in the art, which will fall within the scope of the following claims.

I claim:
1. A movable window construction for an automobile or the like having a body, spaced guide tracks for carrying the window as it is raised and lowered, said tracks being fixedly mounted in the body, said window traversing a generally vertical path into and out of the body and having an endwise movement substantially in the plane of the glass during the raising and lowering thereof, support means cooperating with and extending longitudinally along the bottom of the window, track following means disposed at points spaced along the support means for cooperating with the support means and the tracks during the raising and lowering of the window, means for raising and lowering the window, and stabilizing means for coacting with the window to assist in holding it against displacement relative to the body when the window is projected an appreciable distance out of the body comprising a pair of substantially rigid downwardly extending members, said members being fixed relative to said window support means at spaced points, embracing elements rigidly mounted on the lower end portions of said members, each of said embracing elements being caused to embracingly engage said spaced guide tracks respectively by the motion of said window support means as the window is raised, whereby when the rigid downwardly projecting members and their associated embracing ele- ments engage the relatively fixed guide tracks, the upwardly extending window is stabilized.

2. A movable window construction for an automobile or the like having a body; spaced guide tracks for carrying the window as it is raised and lowered; said tracks being fixedly mounted in the body; said window traversing a generally vertical path into and out of the body and having a longitudinal motion substantially in the plane of the glass during the raising and lowering thereof; said vertical and longitudinal motion including reciprocating and rotating action; support means cooperating with and extending longitudinally along the bottom of the window; track following means disposed at points spaced along the support means for cooperating with the support means and the tracks during the raising and lowering of the window; means for raising and lowering the window; and stabilizing means for coacting with the window to assist in holding it against displacement relative to the body when the window is projected an appreciable distance out of the body comprising a pair of substantially rigid downwardly extending members; said members being fixed relative to said window support means at spaced points; embracing elements rigidly mounted on the lower end portions of said members; said downwardly extending members and said embracing elements being proportioned relative to said tracks, vertical and longitudinal motions, and said reciprocating and rotating actions such that each of said embracing elements are caused to embracingly engage said spaced guide tracks respectively by the motion of said window support means as the window is raised; whereby when the rigid downwardly projecting members and their associated embracing elements engage the relatively fixed guide tracks, the upwardly extending window is stabilized.

3. A movable window construction for an automobile or the like having a body, spaced guide tracks for carrying the window as it is raised and lowered, said tracks being fixedly mounted in the body, said window traversing a generally vertical path into and out of the body substantially in the plane of the glass during the raising and lowering thereof, support means cooperating with and extending longitudinally along the bottom of the window, track following means disposed at points spaced along the support means for cooperating with the support means and the tracks during the raising and lowering of the window, means for raising and lowering the window, and stabilizing means for coacting with the window to assist in holding it against displacement relative to the body when the window is projected an appreciable distance out of the body comprising a pair of substantially rigid downwardly extending members, said members being generally L-shaped to have leg and foot elements, said members being fixed relative to said window support means at spaced points with the foot elements of said L-shaped members pointing in opposite directions, said foot elements being generally U-shaped to form embracing elements rigidly mounted on the lower end of the leg elements of said members, each of said embracing elements being caused to embracingly engage said spaced guide tracks respectively by the motion of said window support means as the window is raised, whereby when the rigid downwardly projecting members and their associated embracing elements engage the relatively fixed guide tracks, the upwardly extending window is stabilized.

4. A movable window construction for an automobile or the like having a body, spaced guide tracks for carrying the window as it is raised and lowered, said tracks being fixedly mounted in the body, said window traversing a generally vertical path into and out of the body and having a longitudinal motion substantially in the plane of the glass during the raising and lowering thereof, said vertical and longitudinal motion including reciprocating and rotating actions, support means cooperating with and extending longitudinally along the bottom of the window, track following means disposed at points spaced along the support means for cooperating with the support means and the tracks during the raising and lowering of the window, means for raising and lowering the window, and stabilizing means for coacting with the window to assist in holding it against displacement relative to the body when the window is projected an appreciable distance out of the body comprising a pair of substantially rigid downwardly extending members, said members being generally L-shaped to have leg and foot elements, said members being fixed relative to said window support means at spaced points with the foot elements of said L-shaped members pointing outwardly in opposite directions, said foot elements being generally U-shaped to form embracing elements rigidly mounted on the lower end of the leg elements of said members, each of said embracing elements being caused to embracingly engage said spaced guide tracks respectively by the vertical and longitudinal motions and reciprocating and rotating actions of said window support means as the window is raised, whereby when the rigid downwardly projecting members and their associated embracing elements engage the relatively fixed guide tracks, the upwardly extending window is stabilized.

5. A door construction for an automobile or the like, the door including a main body adapted to be hingedly supported, a window adapted to be raised and lowered, front and rear guide tracks for said window fixedly mounted in the door body, said window traversing a generally vertical path into and out of the door body through a compound longitudinal and rotative movement substantially in the plane of the glass during the raising and lowering thereof, support means extending longitudinally along the bottom of the window, track following means at the opposite ends of the support means for cooperating with the tracks during the raising and lowering of the window, means for raising and lowering the window, and stabilizing means for cooperating with the window support means to assist in holding the window against lateral displacement relative to the door body when the window is above approximately the mid-point of its travel comprising a pair of substantially rigid downwardly extending members, said members having track embracing elements at the ends thereof, said members being fixed to said window support means adjacent the opposite ends thereof, the embracing elements of said members being turned outwardly in the front and rear directions, each of said embracing elements being caused to engage around one of said front and rear guide tracks respectively by the longitudinal rotative motion of said window support means as said window is raised, whereby when the embracing elements of the rigid downwardly projecting members engage the fixed guide tracks, the upwardly extending window is stabilized.

6. A door and window construction for an automobile or the like, the door including a main body adapted to be hingedly supported, a window adapted to be raised and lowered, front and rear guide tracks for said window fixedly mounted in the door body, said window traversing a generally vertical path into and out of the door body through a compound longitudinal and rotative movement substantially in the plane of the glass during the raising and lowering thereof, support means extending longitudinally along the bottom of the window, track following means at the opposite ends of the support means for cooperating with the tracks during the raising and lowering of the window, means for raising and lowering the window, and stabilizing means for cooperating with the glass support means to assist in holding the window against lateral displacement relative to the door body when the window is above approximately the midpoint of its travel comprising a pair of substantially rigid downwardly extending members, said members having track embracing elements at the ends thereof, said elements being spaced downwardly from said support means, said members being fixed to said window support means adjacent the opposite ends thereof, the embracing elements of said members being turned outwardly in the front and rear directions, first one and then the other of said embracing elements being caused to engage around one of said front and rear guide tracks respectively by the longitudinal rotative motion of said window support means as said window is raised whereby when the embracing elements of the rigid downwardly projecting members engage the fixed guide tracks, the upwardly extending window is stabilized.

7. A door construction for an automobile or the like, the door including a main body adapted to be hingedly supported, a window adapted to be raised and lowered, front and rear guide tracks for said window fixedly mounted in the door body, said window traversing a generally vertical path into and out of the door body through a compound longitudinal and rotative movement substantially in the plane of the glass during the raising and lowering thereof, support means extending longitudinally along the bottom of the window, track following means at the opposite ends of the support means for cooperating with the tracks during the raising and lowering of the window, means for raising and lowering the window, and stabilizing means for cooperating with the glass support means to assist in holding the window against lateral displacement relative to the door body when the window is above approximately the mid-point of its travel comprising a pair of substantially rigid downwardly extending L-shaped members, the foot portion of each of said L-shaped members forming track embracing elements, said members being fixed to said window support means adjacent the opposite ends thereof, the foot portions of said members being turned to face oppositely in the front and rear directions, each of said embracing elements being caused to engage around one of said front and rear guide tracks respectively by the longitudinal rotative motion of said window support means as said window is raised, whereby when the embracing elements of the rigid downwardly projecting members engage the fixed guide tracks, the upwardly extending window is stabilized.

8. A window stabilizer for automobiles and the like wherein the window is moved in a plurality of directions to complete the opening and closing thereof, comprising means to move the window in generally up, down and longitudinal directions, means to guide the window through a predetermined path in said plurality of directions, stabilizing means attached to the lower edge of the window and extending generally downward adjacent said guide means and effecting a cantilever parallel to the plane of the window while admitting movement of its lower end toward and from said guide means, means on the lower portion of said stabilizing means adapted to coact with said guide means to support said window against lateral vibrations, and resilient means cooperating with said stabilizing means to urge it in a direction to engage the means on the stabilizing means with said guide means.

9. A window stabilizing structure for automobiles and the like wherein the window is mounted in a support to be moved in a plurality of directions to complete the opening and closing thereof, comprising means to move the window support in generally up, down and longitudinal directions, means to guide the window support through a combined reciprocating and rotating movement in said directions, stabilizing means attached to the lower edge of the window and extending generally downward adjacent said guide means and effecting a cantilever parallel to the plane of the window while admitting movement of its lower end toward and from said guide means, the downward extension of said stabilizing means being proportioned relative to said reciprocating and rotative movement and the position of said guide means to coact with said guide means to support said window against lateral vibrations when said window moves through the upper portions of the opening and closing movements, and resilient means cooperating with said stabilizing means for urging said stabilizing means into engagement with said guide means during said upper portions of movement of the window.

10. A window stabilizing structure for automobiles and the like wherein the window is moved in a plurality of directions to complete the opening and closing thereof, comprising means to move the window in generally up, down and longitudinal directions, fixed track means supported in said structure to guide the window through a predetermined path in said directions, stabilizing means rigidly mounted relative to said window in a direction transverse to the plane of the window and pivotally mounted for movement in the plane of said window, said stabilizing means including engaging elements adapted to coact with said track means at least when said window moves through the upper portions of said path, and resilient means for urging said stabilizing means in the direction of engagement with the track means whereby said stabilizing means is adapted to pivot relative to and in the plane of said window during longitudinal movement of said window.

11. A movable window construction for an automobile or the like having a body, spaced guide tracks for carrying the window as it is raised and lowered, said tracks being fixedly mounted in the body, said window traversing a generally vertical path into and out of the body substantially in the plane of the glass during the raising and lowering thereof, support means cooperating with and extending longitudinally along the bottom of the window, track following means disposed at points spaced along the support means for cooperating with the tracks during the raising and lowering of the window, means for raising and lowering the window, and stabilizing means for coacting with the window to assist in holding it against lateral displacement relative to the body when the window is projected an appreciable distance out of the body comprising a rigid downwardly extending member pivotally mounted to said support means so as to be rigid in a direction transverse to the plane of the window and movable in a direction lying in the plane of the window, embracing means rigidly mounted on the lower end portion of said member, said embracing element being caused to embracingly engage one of said spaced guide tracks as the window is raised, and said extending member pivoting relative to the window during a portion of its engagement with the guide track as the window is moved longitudinally.

12. A movable window construction for an automobile or the like having a body; spaced guide tracks for carrying the window as it is raised and lowered; said tracks being fixedly mounted in the body; said window traversing a generally vertical path into and out of the body and having a longitudinal motion substantially in the plane of the glass during the raising and lowering thereof; said vertical and longitudinal motion including reciprocating and rotating action; support means cooperating with and extending longitudinally along the bottom of the window; track following means disposed at points spaced along the support means for cooperating with the tracks during the raising and lowering of the window; means for raising and lowering the window and stabilizing means for coacting with the window to assist in holding it against lateral displacement relative to the body when the window is projected an appreciable distance out of the body comprising a substantially rigid downwardly extending member; said member being rigid relative to said window support means in a direction transverse to the plane of the window; said member being movably mounted in a direction lying in the plane of the window; an embracing element rigidly mounted on the lower end portion of said member; resilient means for urging said member toward one of said tracks, said downwardly extending member and said embracing element being proportioned relative to the size of said track, and the combined vertical and longitudinal motions of the glass such that the embracing element is caused to embracingly engage at least one of said spaced guide tracks by the motion of said window support means as the window is raised and to pivot said downwardly extending member and embracing element longitudinally as said window is moved longitudinally whereby when the downwardly projecting member and its associated embracing element and the guide tracks embraced thereby stabilize the upwardly extending window.

13. A movable window construction for an automobile or the like having a body, spaced guide tracks for carrying the window as it is raised and lowered, said tracks being fixedly mounted in the body, said window traversing a combined vertical and longitudinal path into and out of the body substantially in the plane of the glass during the raising and lowering thereof, support means cooperating with and extending longitudinally along the bottom of the window, track following means disposed at points spaced along the support means for cooperating with the tracks during the raising and lowering of the window, means for raising and lowering the window, and stabilizing means for coacting with the window to assist in holding it against lateral displacement relative to the body when the window is projected an appreciable distance out of the body comprising a downwardly extending member pivotally mounted to said support means so as to be movable only in the plane of the window, a U-shaped hook carried by the lower portion of said extending member in a position to engage with one of said tracks during a portion of the raising and lowering of said window, spring means engaging said downwardly extending member for urging said hook into contact with said track, yet permitting movement thereof so that longitudinal motion of the window will pivot said downwardly extending member against the tension of the spring whereby engagement of said hook at the end of the extending members with said track will stabilize said window.

14. A movable window construction for an automobile or the like having a body, means for raising and lowering the window, spaced guide tracks for carrying the window as it is raised and lowered, said tracks being fixedly mounted in the body, said window traversing a path in a generally vertical plane into and out of the body and having a combined horizontal and longitudinal motion substantially in the plane of the glass during the raising and lowering thereof, said vertical and longitudinal motions including both reciprocating and rotating actions, support means cooperating with and extending longitudinally along the bottom of the window, track following means disposed at points spaced along the support means for cooperating with the tracks during the raising and lowering of the window, and stabilizing means for coacting with the window to assist in holding it against lateral displacement relative to the body when the window is projected an appreciable distance out of the body comprising a substantially rigid downwardly extending member, said member being generally L-shaped to have leg and foot elements, said member being pivotally mounted relative to said window support means such that said member may pivot only in the plane of said window, said foot element being generally U-shaped to form an embracing element rigidly mounted on the lower end of the leg element of said member, spring means to bias said member to cause said embracing element to embracingly engage said guide track during the vertical and longitudinal motions and reciprocating and rotating actions of said window support means as the window is raised and lowered and said member being caused to pivot on its mounting by said longitudinal motion of said window against the loading of the spring means, whereby when the rigid downwardly extending members and their associated embracing elements engage the relatively fixed guide tracks, the upwardly extending window is stabilized.

15. A stabilizing structure for automobile door windows where the window is maneuvered in a plurality of directions as well as being tilted endwise in the opening and closing thereof, comprising a track to guide the window through a predetermined path in said maneuvers, means to actuate the window along said track, stabilizing means including a rigid arm having one end attached to the lower edge of the window, with the arm extending generally downward adjacent said track and defining a cantilever parallel to the plane of the window, the lower end of said arm having fixed thereto spaced elements extending toward and adapted to receive said track therebetween during portions of the maneuvering of the window, to thereupon brace the window against lateral shocks.

16. The combination with means for maneuvering a vehicle window in a plurality of directions, including some rotative movement, during the operation of opening and closing the window, of a rigid elongate member connected at one end to the lower edge of the window and extending generally downwardly therefrom and thus defining a cantilever parallel to the plane of the window, elongate anchoring means disposed along and adjacent said member, the lower end of said member having secured thereto spaced jaws extending toward and adapted to receive said anchoring means therebetween and to slide therealong during certain phases of the maneuvering of said window, to thereupon brace the window against lateral jarring.

17. A stabilizing structure for a vehicle door window wherein the window is moved in a plurality of directions to complete the opening and closing thereof, comprising means to move the window in generally up-and-down and endwise directions along a predetermined path, anchoring means fixed in said door and extending generally downward adjacent the ends of the window when closed, stabilizing means rigid with the window and extending downwardly adjacent said anchoring means, said stabilizing means including spaced elements adapted to receive said anchoring means therebetween when the window moves through the upper portions of said path, thereupon to support said window against lateral vibrations.

18. A stabilizing structure for the window of an automobile door wherein the window is mounted on a support movable in a plurality of directions to complete the opening and closing thereof, comprising means to guide the window support through a combined reciprocating and rotative movement in said plurality of directions, means to actuate the support along said guide means, said guide means comprising fixed anchoring means, stabilizer means resiliently attached to said support and extending adjacent said anchoring means, the end of said stabilizing means coacting with said anchoring means and being proportioned relative to said reciprocating and rotative movement and the position of said anchoring means to coact with said anchoring means to support said window against lateral vibrations when said window is in the upper portions of the opening and closing movement.

19. A stabilizing arrangement for the window of an automobile door, wherein the window is projected out of the door structure and moved in a plurality of directions to complete the opening and closing thereof, comprising means to move the window along a predetermined path in said direction, a generally downwardly extending elongate anchoring means fixed within said door structure adjacent the ends of said window when in open position, a downwardly extending arm fixed at one end to the lower edge of said window and forming a cantilever parallel to the plane of said window, said arm in the open position of said window being adjacent said anchoring means, the lower end of said arm including a split portion facing said anchoring means and adapted to receive and slide along said anchoring means during partly open phases of said window movement to brace the window against lateral shocks.

20. A stabilizing structure for automobile door windows where the window is maneuvered in a plurality of directions as well as being tilted endwise in the opening and closing thereof, including a track disposed within the door structure to guide the window through a predetermined path in said maneuvers and means to actuate the window along said track, said stabilizing means including an arm having one end attached to the lower edge of the window with the arm extending generally downward adjacent said track, said arm being rigid in a plane parallel to the window and defining a cantilever parallel to the window, the lower end of said arm being resiliently biased toward said track and having fixed thereto spaced elements facing said track and adapted to receive the track therebetween during portions of the maneuvering of the window, to thereupon brace the window against lateral jar.

References Cited in the file of this patent

UNITED STATES PATENTS

| | | |
|---|---|---|
| 2,746,747 | Lautenbach | May 22, 1956 |
| 2,775,479 | Balint et al. | Dec. 25, 1956 |
| 2,809,827 | Bogden | Oct. 15, 1957 |
| 2,811,387 | Clark | Oct. 29, 1957 |